(12) United States Patent
Potter et al.

(10) Patent No.: US 11,653,793 B2
(45) Date of Patent: May 23, 2023

(54) BLENDER SYSTEM WITH ROTATABLE BLADE ASSEMBLY

(71) Applicant: SharkNinja Operating LLC, Needham, MA (US)

(72) Inventors: Daniel Stephen Potter, Seabrook, NH (US); David M. Audette, Webster, MA (US)

(73) Assignee: SHARKNINJA OPERATING LLC, Needham, MA (US)

( * ) Notice: Subject to any disclaimer, the term of this patent is extended or adjusted under 35 U.S.C. 154(b) by 225 days.

(21) Appl. No.: 17/226,729

(22) Filed: Apr. 9, 2021

(65) Prior Publication Data

US 2021/0219784 A1 Jul. 22, 2021

Related U.S. Application Data

(62) Division of application No. 16/036,613, filed on Jul. 16, 2018, now Pat. No. 11,166,596, which is a
(Continued)

(51) Int. Cl.
*A47J 43/00* (2006.01)
*A47J 43/07* (2006.01)
(Continued)

(52) U.S. Cl.
CPC ....... *A47J 43/0722* (2013.01); *A47J 43/0716* (2013.01); *B01F 27/1123* (2022.01);
(Continued)

(58) Field of Classification Search
CPC .. A47J 43/0772; A47J 43/0716; A47J 43/085; B02C 18/20; B02C 18/12; B02C 18/143
See application file for complete search history.

(56) References Cited

U.S. PATENT DOCUMENTS

| D24,545 S | 8/1895 | Hensel |
| 2,284,155 A | 5/1942 | Landgraf |

(Continued)

FOREIGN PATENT DOCUMENTS

| CN | 101626714 A | 1/2010 |
| CN | 201578095 U | 9/2010 |

(Continued)

OTHER PUBLICATIONS

U.S. Appl. No. 13/261,801, filed May 6, 2014; Non-Final Office Action dated Dec. 11, 2017; 28 pages.
(Continued)

*Primary Examiner* — Faye Francis
(74) *Attorney, Agent, or Firm* — Burns & Levinson, LLP; Joseph M. Maraia

(57) ABSTRACT

A blender system includes a container having a rotatable blade assembly therein, a lid covering an open end of the container, and a base with a motorized unit. When the container is coupled with the base, the motorized unit is adapted to drive rotation of the rotatable blade assembly. The lid includes a hinged actuator lever adapted to actuate the motorized unit. A detent extends from the hinged actuator lever and passes through a series of apertures and presses against a slidable actuator shaft disposed in the container and maintained in its position by a spring force, thereby depressing a switch for the motorized unit. A rotatable blade system includes cutting blade(s) and crushing blade(s). The crushing blade extends longitudinally outwardly from a hub. When the hub rotates in a first direction or second direction opposite the first direction, a face of the crushing blade is leading or trailing, respectively.

4 Claims, 11 Drawing Sheets

Related U.S. Application Data division of application No. 13/261,801, filed as application No. PCT/US2012/048339 on Jul. 26, 2012, now Pat. No. 10,064,520.

(60) Provisional application No. 61/526,398, filed on Aug. 23, 2011, provisional application No. 61/511,614, filed on Jul. 26, 2011.

(51) Int. Cl.
| | |
|---|---|
| *B01F 27/86* | (2022.01) |
| *B01F 27/1123* | (2022.01) |
| *B02C 18/12* | (2006.01) |
| *B02C 18/20* | (2006.01) |
| *A47J 43/08* | (2006.01) |

(52) U.S. Cl.
CPC ............. *B01F 27/86* (2022.01); *B02C 18/12* (2013.01); *B02C 18/20* (2013.01); *A47J 43/085* (2013.01)

(56) References Cited

U.S. PATENT DOCUMENTS

| | | | |
|---|---|---|---|
| 2,702,571 A | 2/1955 | Murray | |
| 2,771,111 A | 11/1956 | Seyfried | |
| 3,738,583 A | 6/1973 | Berland et al. | |
| 3,892,365 A * | 7/1975 | Verdun | A47J 43/06 241/37.5 |
| 4,216,917 A * | 8/1980 | Clare | B26D 7/24 241/37.5 |
| 4,226,373 A * | 10/1980 | Williams | A47J 43/0788 241/37.5 |
| 4,297,038 A * | 10/1981 | Falkenbach | A47J 43/0772 241/37.5 |
| 4,506,836 A * | 3/1985 | Williams | A47J 43/0788 241/37.5 |
| 4,512,522 A * | 4/1985 | Williams | B26D 7/24 241/37.5 |
| 4,629,131 A * | 12/1986 | Podell | F16P 3/10 241/37.5 |
| 4,674,690 A * | 6/1987 | Ponikwia | B26D 7/24 241/37.5 |
| 4,691,870 A * | 9/1987 | Fukunaga | B26D 7/00 241/37.5 |
| 4,706,896 A * | 11/1987 | Moon-Kau | A47J 43/046 241/37.5 |
| 4,741,482 A * | 5/1988 | Coggiola | A47J 43/0766 241/37.5 |
| 4,824,029 A * | 4/1989 | Stottmann | A47J 43/046 D7/412 |
| 5,353,697 A * | 10/1994 | Venturati | A47J 43/0772 241/37.5 |
| 6,666,574 B1 | 12/2003 | Pryor | |
| 6,669,124 B2 * | 12/2003 | Lazzer | F16P 3/08 241/37.5 |
| 6,907,819 B2 * | 6/2005 | Kernan | A47J 43/0794 241/37.5 |
| 6,986,475 B2 * | 1/2006 | Wanat | A47J 43/0727 241/37.5 |
| 7,641,380 B2 | 1/2010 | Behar et al. | |
| 8,220,730 B2 * | 7/2012 | Ferraby | H01H 9/226 241/37.5 |
| D690,159 S | 9/2013 | Gursel et al. | |
| 8,721,165 B2 | 5/2014 | Conti | |
| D709,325 S | 7/2014 | Guo et al. | |
| 8,800,905 B2 | 8/2014 | Lee et al. | |
| 9,010,668 B2 * | 4/2015 | Garcia | B02C 25/00 241/37.5 |
| 9,084,508 B2 * | 7/2015 | Sandford | A47J 43/046 |
| D783,353 S | 4/2017 | Smith | |
| 9,770,135 B2 * | 9/2017 | Hensel | A47J 43/00 |
| 10,610,055 B2 * | 4/2020 | Haney | A47J 43/0761 |
| 2002/0176320 A1 | 11/2002 | Wulf et al. | |
| 2005/0099884 A1 | 5/2005 | Lee | |
| 2007/0095961 A1 | 5/2007 | Lin et al. | |
| 2008/0198691 A1 | 8/2008 | Behar et al. | |
| 2008/0217446 A1 * | 9/2008 | Clapp | A47J 43/0772 241/37.5 |
| 2009/0114616 A1 | 5/2009 | White et al. | |
| 2009/0260236 A1 | 10/2009 | Lin | |
| 2010/0071219 A1 | 3/2010 | Lin | |
| 2013/0233952 A1 * | 9/2013 | Pryor, Jr. | A47J 43/085 241/36 |
| 2014/0021278 A1 * | 1/2014 | Armstrong | A47J 36/06 241/37.5 |
| 2014/0084094 A1 | 3/2014 | Lee | |
| 2015/0037480 A1 * | 2/2015 | Carlson | A47J 43/0794 241/36 |

FOREIGN PATENT DOCUMENTS

| | | | |
|---|---|---|---|
| EP | 1969980 A1 | 9/2008 | |
| ES | 2005071 A6 | 3/1989 | |
| ES | 2341821 A1 | 6/2010 | |
| JP | S5534912 A | 3/1980 | |
| JP | H0321712 B2 | 3/1991 | |
| JP | H0417820 B2 | 3/1992 | |
| JP | H10192158 A | 7/1998 | |
| JP | 3055261 B2 | 6/2000 | |
| JP | 2002360452 A | 12/2002 | |
| JP | 5985633 B2 | 9/2016 | |
| WO | 2008101148 A1 | 8/2008 | |
| WO | 2010150263 A2 | 12/2010 | |

OTHER PUBLICATIONS

U.S. Appl. No. 16/036,613, filed Jul. 16, 2018; Non-Final Office Action dated Dec. 8, 2020; 15 pages.
AU Notice of Acceptance; Application No. 2012286803; dated Nov. 5, 2015, pp. 1-2.
CA Notice of Acceptance; Application No. 2,842,832; dated Dec. 10, 2015, pp. 1-2.
CN Notice of Acceptance; Application No. 201280044044.3; dated Mar. 3, 2017, pp. 1-5.
CN Office Action with English Translation; Application No. 201280044044.3; dated Jan. 5, 2016, pp. 1-26.
CN Office Action with English Translation; Application No. 201280044044.3; dated Sep. 5, 2016, pp. 1-15.
EP Communication Pursuant to Article 94(3) EPC; Application No. 12 818 069.2-1656; dated Jul. 6, 2017; pp. 1-4.
EP Communication Pursuant to Rule 164(1) EPC; Application No. 12818069.2-1656/2736392 PCT/US2012048339 datd Dec. 18, 2015, pp. 1-8.
EP Communication; Extended European Search Report; Application No. 12818069.2-1656/2736392 PCT/US2012048339; dated Apr. 15, 2016, pp. 1-10.
IPRP; International Application No. PCT/US2012/048339; International Filing Date: Jul. 26, 2012, dated Jan. 28, 2014, pp. 1-6.
JP Notice of Acceptance; Application No. 2014-523001; dated Jul. 4, 2016 pp. 1-3.
JP Office Action Translation; JP Application No. 2016-061477; dated Dec. 12, 2016, pp. 1-3.
JP Office Action; Application No. 2014-523001; dated Mar. 2, 2015; pp. 1-4.
Office Action for Chinese Application No. 201280044044.3, in Chinese and with English Language Translation, dated Apr. 27, 2015.
Office Action for Japanese Application No. JP 2014-523001, dated Mar. 2, 2015, in Japanese with English Translation Claims as pending in Japanese Application No. JP 2014-523001.
PCT Notification of Transmittal of the International Search Report and the Written Opinion of the International Searching Authority, or the Declaration, International Appliction No. PCT/US 2012/048339; International Filing Date Jul. 26, 2012, dated Nov. 15, 2012, pp. 1-14.

(56) References Cited

OTHER PUBLICATIONS

Written Opinion of the INternational Searching Authority (Russia) dated Nov. 15, 2012 five (5) pages.

\* cited by examiner

BLENDER SYSTEM WITH ROTATABLE BLADE ASSEMBLY

RELATED APPLICATIONS

This application is a divisional of U.S. application Ser. No. 16/036,613, filed Jul. 16, 2018, now U.S. Pat. No. 11,166,596, which is a divisional of U.S. application Ser. No. 13/261,801, filed May 6, 2014, now U.S. Pat. No. 10,064,520, which is a National Stage Entry of PCT/US2012/048339, filed Jul. 26, 2012, which claims priority to, and the benefit of U.S. provisional application No. 61/511,614, filed Jul. 26, 2011, for all subject matter common to both applications. This application also claims priority to, and the benefit of, U.S. provisional application No. 61/526,398, filed Aug. 23, 2011, for all subject matter common to both applications. The disclosures of said provisional applications are hereby incorporated by reference herein.

FIELD OF THE INVENTION

The present invention relates to blender systems adapted to process food products. More particularly, the present invention provides a blender system having a container, a lid, and a motorized base capable of being actuated by a user by way of the lid, and additionally to a rotatable blade assembly having both a plurality of cutting blades and at least one crushing blade.

BACKGROUND OF THE INVENTION

Blenders are commonly used to process a plurality of different food products, including liquids, solids, semi-solids, gels, and the like. It well-known that blenders are useful devices for blending, cutting, and dicing food products in a wide variety of commercial settings, including home kitchen use, professional restaurant or food services use, and large-scale industrial use. They offer a convenient alternative to chopping or dicing by hand, and often come with a range of operational settings and modes adapted to provide specific types or amounts of food processing, e.g., as catered to particular food products.

Conventional blenders include one or more blades disposed in a bottom portion of a container. Rotational motion of the blades is driven by a motor housed in a base of the blender. In most conventional blenders, a user is enabled to actuate the motor by turning a knob disposed on an exterior face of base or pressing a button disposed on an exterior face of the base. This design, however, can require a user to repeatedly press one or more buttons or turn the knob multiple times to achieve pulsed operation of the motor. These types of actions tend to be less convenient and intuitive for users. Moreover, the placement of such knobs or buttons solely on an exterior face of the base can be inconvenient for users and can result in a user repeatedly moving back and forth between the base and the lid to repeatedly check the contents of the blender to determine if additional processing of the food is necessary.

Furthermore, typical blenders utilize cutting blades that are insufficient for performing as diverse a range of food processing operations as may be desired by users. In particular, cutting blades tend to chop food very finely without providing a mechanism for adequately crushing other food items, such as for example, ice. Those of skill in the art will appreciate that many conventional blenders fail at crushing ice at a suitably fast rate (e.g., at a rate that is the same as or comparable to the rate at which non-ice ingredients being processed are cut).

SUMMARY

Accordingly, there is a need for blender systems adapted with handling abilities and mechanisms for actuating the motor. Furthermore, there is a need for blender systems providing more robust cutting and crushing capabilities. The present invention is directed toward solutions to address these and other needs, in addition to having other desirable characteristics that will be appreciated by one of skill in the art upon reading the present specification.

In accordance with an example embodiment of the present invention, a blade assembly for a blender can include a hub having a central axis about which the blade assembly rotates. A plurality of cutting blades can extend radially outwardly from the hub, each of the cutting blades having a sharp cutting edge, a blunt spine edge, and a cutting blade face therebetween. At least one crushing blade can extend longitudinally outwardly from the hub, the at least one crushing blade having a first edge, a second edge, and a crushing blade face therebetween. The plurality of cutting blades can be oriented in such a way as to cause the sharp cutting edge of each blade to be a leading surface and the blunt spine edge to be a trailing surface when the hub rotates in a first direction, and the blunt spine edge of each blade to be a leading surface and the sharp cutting edge to be a trailing surface when the hub rotates in a second direction opposite the first direction. The at least one crushing blade can be oriented in such a way as to cause the crushing blade face to be a leading surface when the hub rotates in a first direction and a trailing surface when the hub rotates in a second direction.

In accordance with aspects of the present invention, for each of the plurality of cutting blades, the sharp cutting edge can be sharper than the blunt spine edge. The sharp cutting edge of a first of the plurality of cutting blades can have a first radius of curvature and the sharp cutting edge of a second of the plurality of cutting blades has a second radius of curvature. The second radius of curvature can be smaller than the first radius of curvature. The sharp cutting edge of a third of the plurality of cutting blades can have a third radius of curvature and the sharp cutting edge of a fourth of the plurality of cutting blades can have a fourth radius of curvature. The fourth radius of curvature can be smaller than the third radius of curvature. The blade assembly can be operable to crush food products with the leading surface of the at least one crushing blade when the hub rotates about the central axis. When the hub is rotating in a first direction, the leading surface of at least one of the plurality of cutting blades can be the sharp cutting edge and the leading surface of the at least one crushing blade can be the crushing blade face. When the hub is rotating in a first direction, the leading surface of at least one of the plurality of cutting blades can be the blunt spine edge and the leading surface of the at least one crushing blade can be the crushing blade face.

In accordance with an example embodiment of the present invention, a blender container can include a bottom section and one or more container walls extending upward from the bottom section and defining an interior volume of space forming a work chamber for processing one or more food products. The one or more walls can terminate at a top section opposite the bottom section and can have an opening providing access to the work chamber. The one or more container walls can include a plurality of ledge surface features sized, dimensioned, and oriented, in such a way as to hinder vortex formation by food contents within the work chamber during a blending operation.

In accordance with aspects of the present invention, each of the plurality of ledge surface features can include a surface having a decreasing radius of curvature as measured from a center point in the bottom section of the container terminating in an abrupt ledge wherein the surface forms a corner and extends in a radially outward direction from the center point. The container further can include a lid sized and dimensioned to cover the opening in the top section when positioned on top of the container.

In accordance with an example embodiment of the present invention, a blender system can include a blender container having a bottom section and one or more container walls extending upward from the bottom section and defining an interior volume of space forming a work chamber for processing one or more food products. The one or more walls can terminate at a top section opposite the bottom section and can have an opening providing access to the work chamber. The one or more container walls can include a plurality of ledge surface features sized, dimensioned, and oriented, to hinder vortex formation by food contents within the work chamber during a blending operation. The blender system further can include a blade assembly comprised of a hub having a central axis about which the blade assembly rotates. A plurality of cutting blades can extend radially outwardly from the hub, and each of the cutting blades can have a sharp cutting edge, a blunt spine edge, and a cutting blade face therebetween. At least one crushing blade can extend longitudinally outwardly from the hub. The at least one crushing blade can have a first edge, a second edge, and a crushing blade face therebetween. The plurality of cutting blades can be oriented in such a way as to cause the sharp cutting edge of each blade to be a leading surface and the blunt spine edge to be a trailing surface when the hub rotates in a first direction, and the blunt spine edge of each blade to be a leading surface and the sharp cutting edge to be a trailing surface when the hub rotates in a second direction opposite the first direction. The at least one crushing blade can be oriented in such a way as to cause the crushing blade face to be a leading surface when the hub rotates in a first direction and a trailing surface when the hub rotates in a second direction.

In accordance with aspects of the present invention, the blender system further can include a motorized unit disposed in a base configured to receive and couple with the container in such a way as to mechanically couple the motorized unit with the hub of the blade assembly to supply rotational energy to the blade assembly.

In accordance with an example embodiment of the present invention, a blender system can include a container comprising a bottom section and one or more container walls extending upward from the bottom section and defining an interior volume of space forming a work chamber for processing one or more food products. The one or more walls can terminate at a top section opposite the bottom section and having an opening providing access to the work chamber. A rotatable blade assembly can be disposed in the work chamber and can be operable for processing food contained within the work chamber through rotational action. A keeper can be disposed in the top section. A slidable actuator shaft can extend between the bottom section and the top section and can be configured to slide between a first position and a second position. A lid can be sized and dimensioned to cover the opening in the top section when positioned on top of the container. The lid can include a hinged actuator lever with at least one locking tab sized, dimensioned, and oriented to engage with the keeper to mechanically lock the lid to the container when pivoted from a first position to a second position. The lid further can include a detent disposed in the hinged actuator lever and sized, dimensioned, and oriented to intersect with the slidable actuator shaft of the container when the lid is positioned on top of the container and the hinged actuator lever is pivoted to the second position. The blender system can include a motorized unit disposed in a base configured to receive and couple with the container in such a way as to mechanically couple the motorized unit with the blade assembly to supply rotational energy thereto. The motorized unit can be activated by a mechanical switch. When the detent of the lid intersects with the slidable actuator shaft of the container, the slidable actuator shaft can slide from the first position to the second position in such a way as to mechanically intersect with and move the mechanical switch from an off position to an on position, thereby activating the motorized unit and causing the blade assembly to rotate.

In accordance with aspects of the present invention, a spring force can be applied to the slidable actuator shaft, which pushes the slidable actuator shaft generally toward the first position. A force applied by the detent against the slidable actuator shaft can be sufficient in quantity so as to overcome the spring force and cause the slidable actuator shaft to move from the first position toward the second position. When the hinged actuator lever is pivoted away from the second position toward the first position, the detent no longer intersects with the slidable actuator shaft and the spring force is sufficient in quantity to return the slidable actuator shaft to the first position.

BRIEF DESCRIPTION OF THE FIGURES

These and other characteristics of the present invention will be more fully understood by reference to the following detailed description in conjunction with the attached drawings, in which.

DETAILED DESCRIPTION

Figure 1:
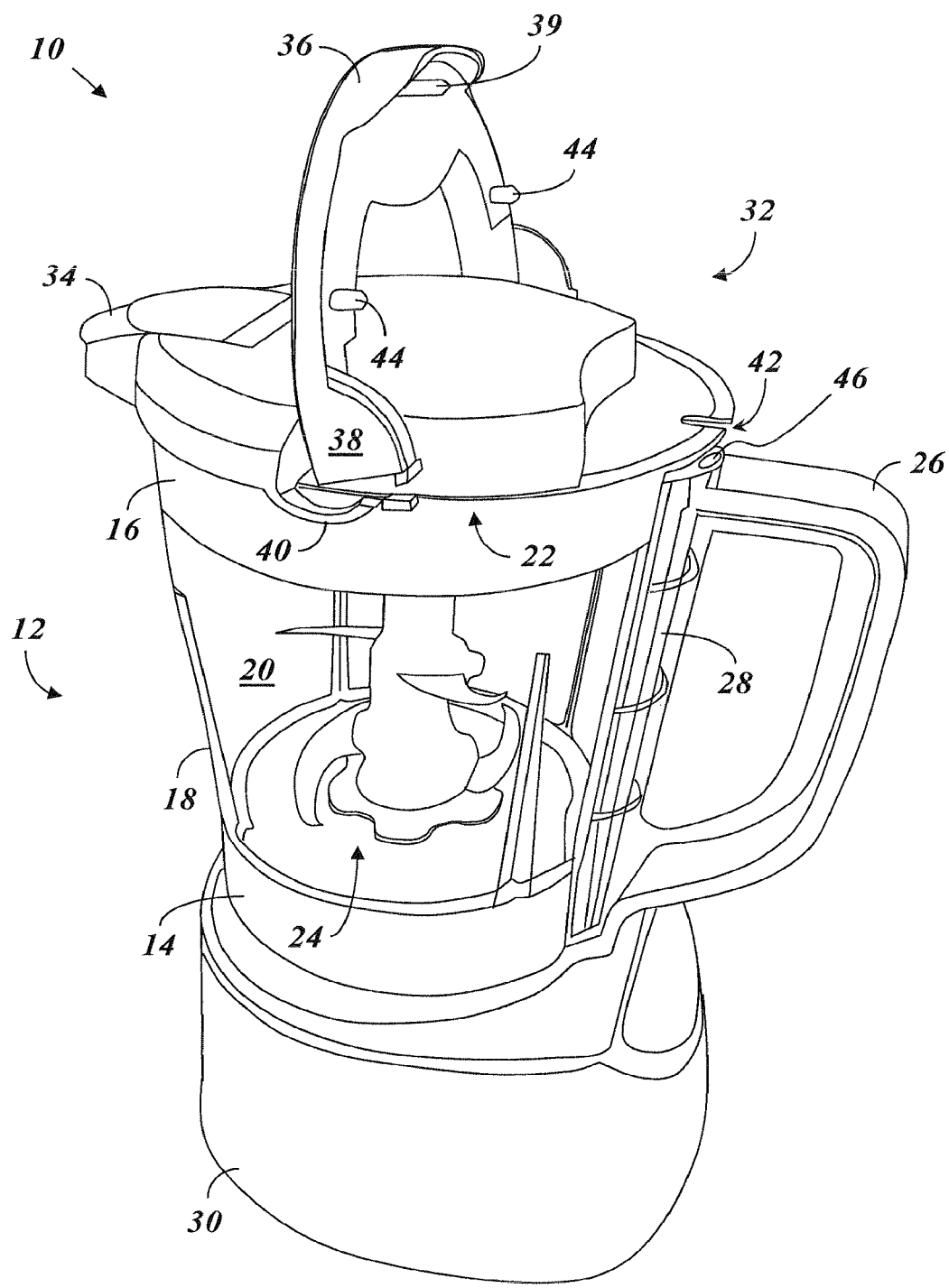
FIG. 1 is a perspective view of a blender system that includes a container having a slidable actuator shaft and a lid having a hinged actuator lever, according to an example embodiment of the present invention.

An illustrative embodiment of the present invention relates to a blender system. The blender system generally includes a container having a rotatable blade assembly disposed therein, a lid covering an open top end of the container, and a base that houses a motorized unit. When the container is coupled with the base, a mechanical coupling is established between the motorized unit and the rotatable blade assembly. Notably, the lid includes a hinged actuator lever adapted to actuate the motorized unit. For example, the hinged actuator lever can be moveable (e.g., by hinging or pivoting) from a first upright position to a second flat position. When moved into the second flat position, a detent extending from the hinged actuator lever passes through a series of apertures to engage a slidable actuator shaft disposed in the container. In particular, the detent can be caused to press against the slidable actuator shaft in such a way as to overcome a spring force maintaining the slidable actuator shaft in a first position. While the detent remains pressed down against the slidable actuator shaft (e.g., by a user pressing the hinged actuator lever), the slidable actuator shaft remains in a second position. In the second position, an end portion of the slidable actuator shaft may extend beyond a bottom edge of the container and move a mechanical switch on the base. Depressing the switch causes the switch to move from an off position to an on position, thereby activating the motorized unit in the base to drive rotation of the rotatable blade assembly.

Furthermore, in accordance with another illustrative embodiment of the present invention, a rotatable blade system is provided. Notably, the rotatable blade system includes a plurality of cutting blades, as well as at least one crushing blade. The plurality of cutting blades can extend radially outward from a hub (e.g., an axle, etc.) adapted to rotate about its central axis. The hub extends upward from a foundation that is adapted to couple with (e.g., screw onto) a container of a blender assembly. The crushing blade can extend longitudinally outwardly from the hub (e.g., vertically upward, as oriented in the manner shown in the figures). The crushing blade can be disposed at a position that is higher up on hub than the position of the plurality of cutting blades. When the hub is rotating in a first direction, the blades can be oriented such that (a) a sharp cutting edge on each of the plurality of cutting blades is a leading surface and (b) a crushing blade face on the crushing blade is a leading surface. In addition, when the hub is rotating in a second direction opposite the first direction, this orientation of the blades can cause (a) a blunt spine edge on each of the plurality of cutting blades to be a leading surface and (b) the crushing blade face on the crushing blade to be a trailing surface.

FIGS. 1 through 12, wherein like parts are designated by like reference numerals throughout, illustrate example embodiments of a blender, according to the present invention. Although the present invention will be described with reference to the example embodiments illustrated in the figures, it should be understood that many alternative forms can embody the present invention. One of skill in the art will additionally appreciate different ways to alter the parameters of the embodiments disclosed, such as the size, shape, or type of elements or materials, in a manner still in keeping with the spirit and scope of the present invention.

Figure 2:
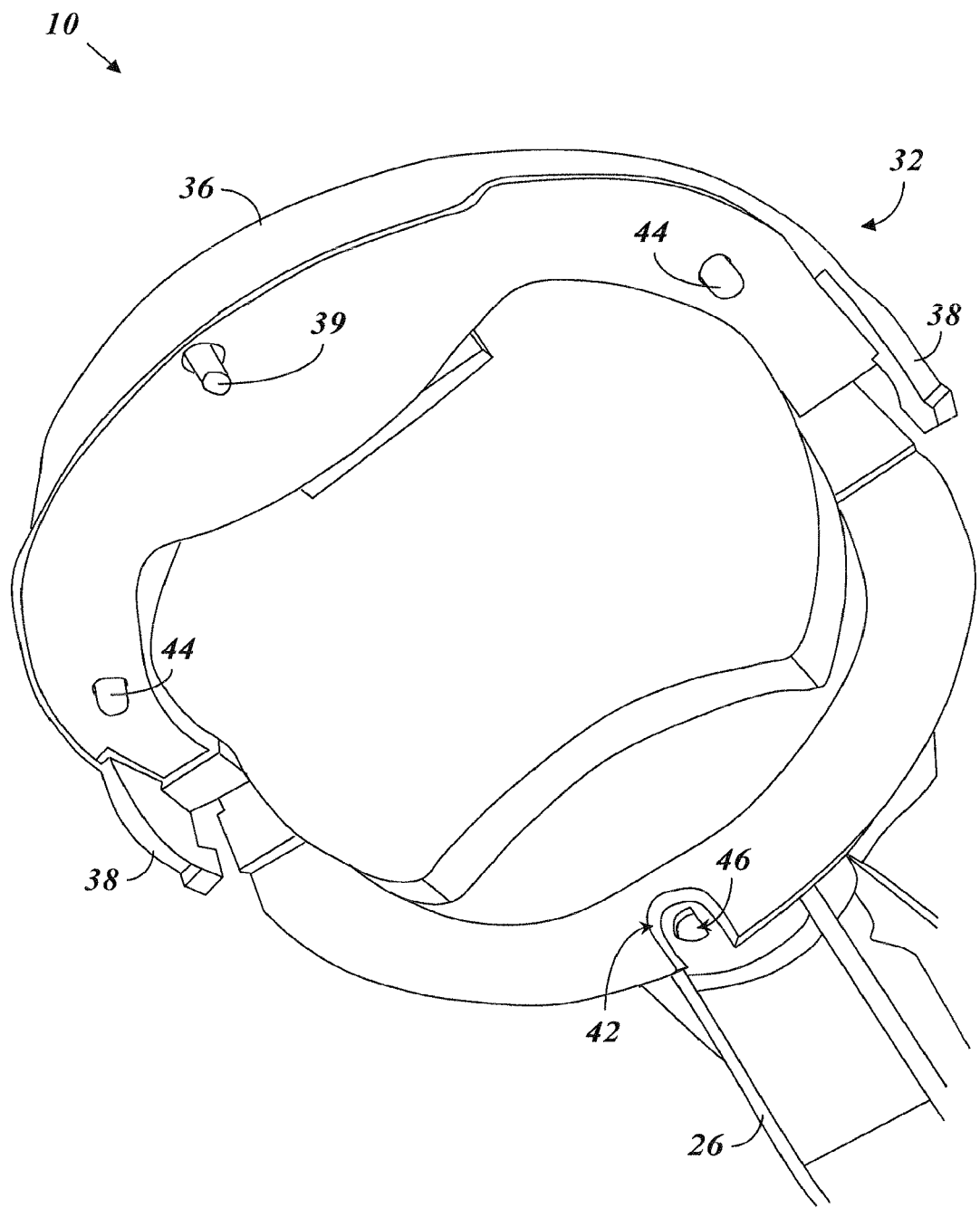
FIG. 2 is an upper perspective view of the lid of the blender system of FIG. 1, according to aspects of the present invention.

FIGS. 1 and 2 depict perspective views of a blender system 10 according to an example embodiment of the present invention. The blender system 10 includes a container 12 adapted (e.g., sized and dimensioned) to receive food products to be processed. In general, the blender system 10 can be adapted to perform any food processing or blending including as non-limiting examples, dicing, chopping, cutting, slicing, mixing, blending, stirring, crushing, or the like. The container 12 generally includes a bottom section 14, a top section 16, and one or more walls 18 extending between the bottom section 14 and the top section 16. The one or more walls 18 define an interior volume of space forming a work chamber 20, within which food products are placed and processed. At the top section 16 of the container 12 is an opening 22 that provides access into the work chamber 20 (e.g., by a user). The bottom section 14 is generally closed as depicted in the example embodiment if FIGS. 1 and 2, such that food products contained in the work chamber 20 are unable to escape the container 12 through the bottom section 14. Disposed within the work chamber 20 is a rotatable blade assembly 24 adapted to facilitate processing and/or blending of food products. The container 12 can include a handle 26 for facilitating transportation and manipulation of the container 12.

In addition to the container 12, the blender system 10 can also include a base 30 configured (e.g., sized, shaped, and arranged) to receive and couple with the container 12. The base 30 can include a housing 31 a motorized unit (not visible in FIGS. 1 and 2) contained within the housing. The base 30 can be adapted to couple with the container 12 in such a way that the motorized unit and the rotatable blade assembly 24 become mechanically coupled, and the motorized unit can be adapted to drive rotation of the rotatable blade assembly 24 once mechanically coupled thereto, as would be appreciated by those of skill in the art.

The container 12 can include a slidable actuator shaft 28 extending between the bottom section 14 and the top section 16 and configured to slide between a first position and a second position. In the example embodiment of FIGS. 1 and 2, the first and second positions are characterized by different relative heights of the slidable actuator shaft 28 (as oriented in FIGS. 1 and 2). More specifically, when in the first position, the slidable actuator shaft 28 of the example embodiment of FIGS. 1 and 2 is disposed at a relatively higher position (in relation to the top and bottom sections 14, 16 of the container 12) than when in the section position. Accordingly, moving the slidable actuator shaft 28 into the second position from the first position causes the slidable actuator shaft 28 to be lowered away from the top section 16 of the container 12. As will be described in greater detail herein, this lowering movement of the slidable actuator shaft 28 can cause an end portion or the slidable actuator shaft 28 to engage and activate the motorized unit in the base 30 to drive rotation of the rotatable blade assembly 24. For example, in some illustrative embodiments, this lowering movement of the slidable actuator shaft 28 causes an end portion of the slidable actuator shaft 28 to extend beyond the edge of the bottom section 14 of the container 12 and press against a mechanical switch on the motorized unit. Accordingly, the slidable actuator shaft 28 can be housed in a compartment coupled to the one or more walls 18, and the compartment can be at least partially open on its bottom end, e.g., to allow the end portion of the slidable actuator shaft 28 to pass therethrough.

Figure 5:
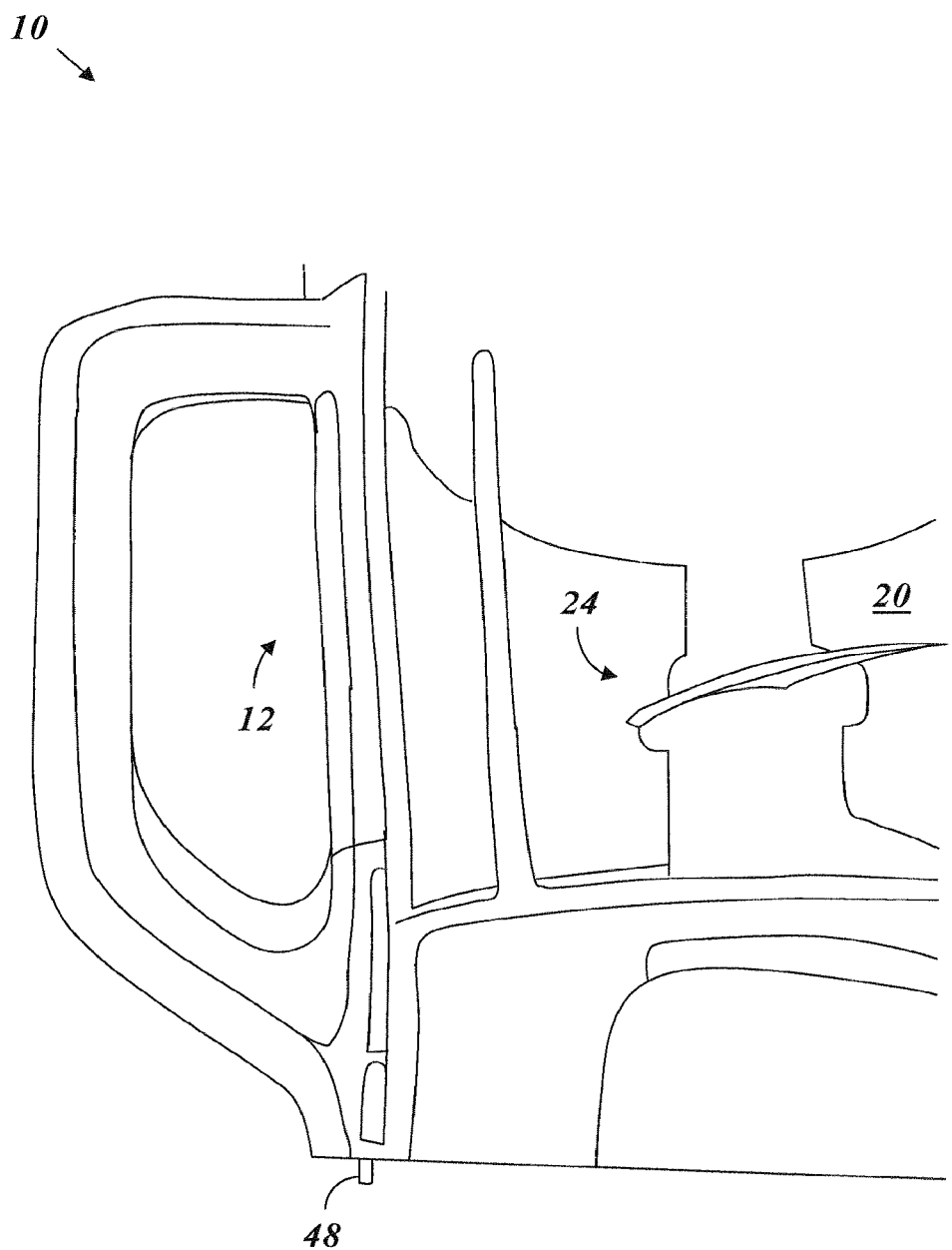
FIG. 5 is a second perspective view of the blender system of FIG. 1 with the slidable actuator shaft arranged in the second position of FIG. 4, according to aspects of the present invention.

The blender system 10 can include a lid 32 sized and dimensioned to cover the opening 22 at the top section 16 of the container 12. The lid 32 can include a pour spout 34, as illustrated in FIGS. 1 and 2. The lid 32 additionally can include a hinged actuator lever 36 adapted to engage the slidable actuator shaft 28 of the container 12. The hinged actuator lever 36 is movable between (a) a first position in which the slidable actuator shaft 28 is not engaged (e.g., an upright position, as depicted in FIGS. 1 and 2) and (b) a second position in which the slidable actuator shaft 28 is engaged (e.g., a flat position, as depicted in FIG. 5). In accordance with illustrative embodiments of the present invention, engaging the slidable actuator shaft 28 activates the motorized unit in the base 30, as described in greater detail herein.

The hinged actuator lever 36 can include at least one locking tab 38 (e.g., two are included in the example embodiment of FIGS. 1 and 2) that is sized, dimensioned, and orientated to engage with a keeper 40 disposed in the top section 16 of the container 12 (e.g., and extending from the one or more walls 18 of the container 12). More specifically, the locking tab 38 is adapted to engage with the keeper 40 to mechanically lock the lid 32 to the container 12 when the hinged actuator lever 36 is pivoted from the first position to the second position. For example, the keeper 40 can be shaped as a semi-circular track protruding from an exterior side of the one or more walls 18, and the locking tab 38 can be shaped as a corresponding semi-circular protrusion that slides beneath the keeper 40 and presses up against the keeper 40 when the hinged actuator lever 36 is moved into the second position. In this way, the combined locking effect of the locking tab 38 and the keeper 40 prevents the lid 32 from lifting up and becoming removed from the container 12 when the hinged actuator lever 36 is in the second position and the motorized unit is driving rotation of the rotatable blade assembly 24.

The lid 32 also can include detent 39 extending from the hinged actuator lever 36. The detent 39 can be sized and positioned to engage the slidable actuator shaft 28 of the container 12 and to cause the slidable actuator shaft 28 to move from its first position to its second position. In particular, the lid 32 can include an aperture 42 disposed therein and therethrough. The container 12 likewise can include an aperture 46 disposed therein and therethrough. The aperture 46 in the container 12 can lead directly to a compartment housing the slidable actuator shaft 28. Furthermore, when the lid 32 is properly coupled to the container 12, the apertures 42, 46 are aligned and overlapping. Accordingly, the detent 39 can be sized and positioned on the hinged actuator lever 36 in such a way that moving the hinged actuator lever 36 into the second position causes the detent 39 to pass through the apertures 42, 46 and to press down on the slidable actuator shaft 28. In this way, a user controlling the hinged actuator lever 36 is able to cause the slidable actuator shaft 28 to move into the second position, thereby triggering the motorized unit to drive rotation of the rotatable blade assembly 24.

One or more spring-loaded pins 44 (e.g., two are included in the example embodiment of FIGS. 1 and 2) can be disposed on and can extend from the hinged actuator lever 36. When the hinged actuator lever 36 is in the first position and the detent 39 is not engaging the slidable actuator shaft 28, the spring-loaded pins 44 are in a natural, uncompressed and non-retracted position. When the hinged actuator lever 36 is moved into the second position, the spring-loaded pins 44 are caused to press against a surface of the lid 32 and, as a result, retract. This generates a spring force in the spring-loaded pins 44, which tends to push the hinged actuator lever 36 out of the second position, absent the force applied by the user to the hinged actuator lever 36. Thus, in such embodiments, for a user to maintain the hinged actuator lever 36 in the second position (during which time the rotatable blade assembly 24 is spinning) the user must apply and maintain a force against the hinged actuator lever 36. This can be beneficial, for example, in preventing unwanted or accidental activation of the rotatable blade assembly 24 due to a user forgetting or inadvertently failing to move the hinged actuator lever 36 from the second position back into the first position. Alternatively to the illustrative embodiment of FIGS. 1 and 2, the one or more spring-loaded pins 44 can be positioned on the flat surface of the lid 32 which receives the hinged actuator lever 36, as would be appreciated by one of skill in the art upon reading the present specification. Furthermore, in some embodiments, the spring-loaded pins 44 are not included in the lid 32.

Figure 3:
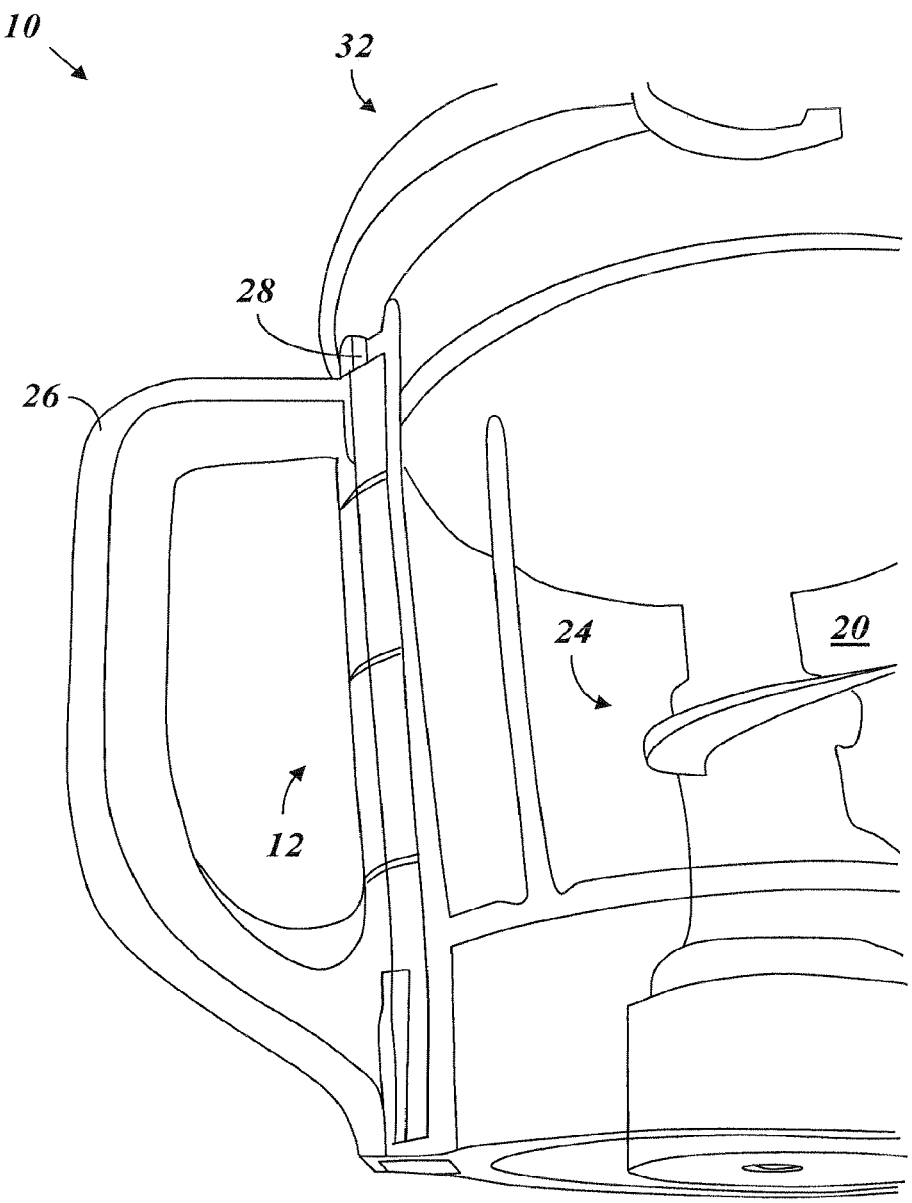
FIG. 3 is a lower perspective view of the blender system of FIG. 1 with the slidable actuator shaft and hinged actuator lever in respective first positions, according to aspects of the present invention.

FIG. 3 depicts a side view of the container 12 with the lid 32 disposed thereon with the slidable actuator shaft 28 and hinged actuator lever 36 in their respective first positions. As shown, in this example embodiment, the slidable actuator shaft 28 does not extend beyond the bottom edge of the container 12 when the slidable actuator shaft 28 is in its first position. Accordingly, the slidable actuator shaft 28 can be spring-loaded to naturally remain in the first position (e.g., can remain in the first position in the absence of a downward force on the slidable actuator shaft 28 that is larger than the force of the spring system maintaining the slidable actuator shaft 28 in the first position). Stated differently, a spring force is applied to the slidable actuator shaft 28 which tends to push the slidable actuator shaft 28 generally toward the first position. Accordingly, to overcome the spring force and maintain the slidable actuator shaft 28 in the second position, a user may press down against the hinged actuator lever 36 with a force that is greater than the spring force applied to the slidable actuator shaft 28.

Figure 4:
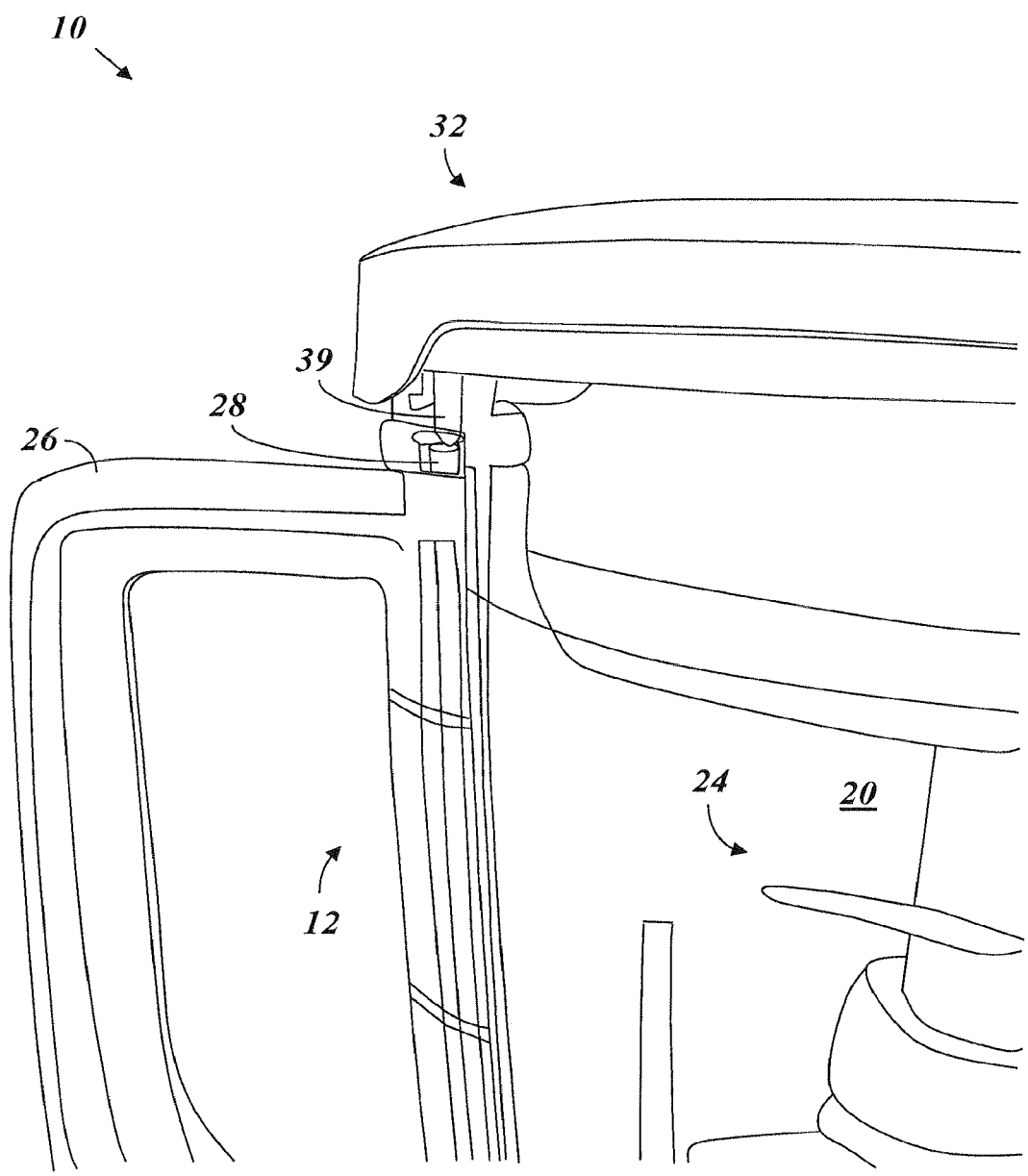
FIG. 4 is a first perspective view of the blender system of FIG. 1 with the slidable actuator shaft and hinged actuator lever in respective second positions, according to aspects of the present invention.

Reference is now made to FIGS. 4 and 5, which show side views of the container 12 with the lid 32 disposed thereon and the slidable actuator shaft 28 and hinged actuator lever 36 in their respective second positions. As depicted in FIGS. 4 and 5, a user can maintain the hinged actuator lever 36 in its second position by applying a pressure against the hinged actuator lever 36. This causes the hinged actuator lever 36 to engage with and press down upon the slidable actuator shaft 28. The slidable actuator shaft 28, as a result, is moved into its second position, causing an end portion 48 thereof to extend beyond the bottom edge of the container 12, thereby enabling it to activate the motorized unit. Furthermore, when the hinged actuator lever 36 is pivoted away from its second position back toward its first position, the detent 39 no longer intersects with the slidable actuator shaft 28 and the spring force is sufficient in quantity to return the slidable actuator shaft 28 to its first position.

Figure 6:
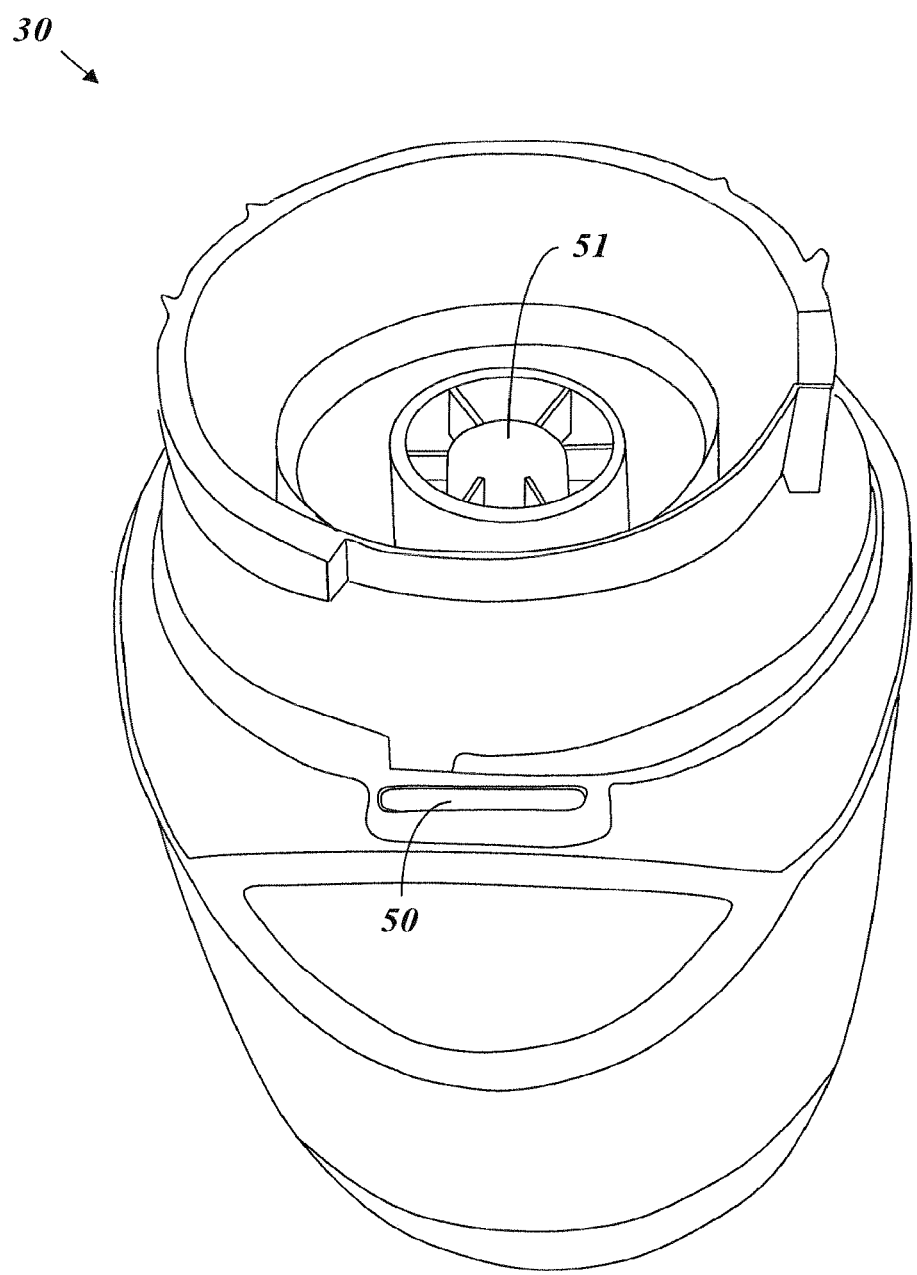
FIG. 6 is a perspective view of a base of the blender assembly of FIG. 1 including a mechanical switch, according to an example embodiment of the present invention.

More specifically, in illustrative embodiments, the motorized unit in the base 30 includes a mechanical switch that is adapted to be depressed by the end portion 48 of the slidable actuator shaft 28 when the slidable actuator shaft 28 is in the second position. For example, FIG. 6 depicts a perspective view of the base 30 of the blender system 10 including such a mechanical switch 50. The switch 50 is positioned to be directly beneath the slidable actuator shaft 28 when the container 12 is coupled to the base 30. Furthermore, the switch 50 of the motorized unit is directly exposed to the slidable actuator shaft 28. Accordingly, coupling the container 12 with the base 30 and moving the hinged actuator lever 36 into its second position causes the end portion 48 of the slidable actuator shaft 28 to extend downward and mechanically intersect and move the switch 50 from an off position to an on position. Depressing the switch 50 in this way activates the motorized unit within the base 30 to drive rotation of the rotatable blade assembly 24. Accordingly, processing of food products contained within the work chamber 20 can be conveniently commenced and halted through simple control and manipulation of the hinged actuator lever 36.

As further illustrated in FIG. 6, the base 30 can also include a gear unit 51 surrounded by a cylindrical wall 55 forming a volume of space adapted to receive the container 12 (e.g., or some portion thereof or constituent component coupled thereto). The gear unit 51 is coupled, within the base, to the motorized unit. The gear unit 51 further is adapted to mechanically couple with the rotatable blade assembly 24 when the container 12 is coupled with the base 30, as would be appreciated by one of skill in the art upon reading the present specification. This mechanical coupling between the gear unit 51 and the rotatable blade assembly 24 enables the motorized unit to drive rotation of the rotatable blade assembly 24, e.g., by way of the gear unit 51. In addition to the gear unit 51, the base 30 optionally can also include a plurality of recesses (not shown) for receiving longitudinal tabs (not shown) disposed along the length of the container 12, as would be appreciated by one of skill in the art upon reading the present specification. The longitudinal tabs (not shown) may function as guides to ensure that the container 12 is complementarily and properly received by the base 30.

In accordance with some alternative embodiments of the present invention, the switch 50 can include a portion that extends upward into a compartment housing the slidable actuator shaft 28. In such alternative embodiments, activation of the motorized unit does not require that the end portion 48 of the slidable actuator shaft 28 extend beyond the bottom edge of the container 12 when the slidable actuator shaft 28 is in the second position.

In accordance with some embodiments of the present invention, pulsed processing of food products may occur by periodic or intermittent control and manipulation of the hinged actuator lever 36. In other embodiments, an external lock (not shown) may be included adjacent the hinged actuator lever 36 of the lid 32 to restrict the blender system 10 to continuous, non-intermittent operation.

In general, the rotatable blade assembly 24 can be any suitable or conventional blade assembly, as would be appreciated by one of skill in the art. However, in accordance with certain further illustrative embodiments of the present invention, the rotatable blade assembly 24 can be implemented using a novel rotatable blade assembly 24', which will now be described with reference to FIGS. 7A through 10. Although the novel rotatable blade assembly 24' is described herein with reference to operation with and inclusion in the illustrative blender system 10 of FIGS. 1 and 2, it should be understood that the rotatable blade assembly 24' alternatively can be a stand-alone device and/or can be included in other any conventional or suitable blender assembly not described or depicted herein. In accordance with aspects of the present invention, the rotatable blade assembly 24' is not limited to use or inclusion with the illustrative blender system 10 of FIGS. 1 and 2, or with any other blender assembly.

Figure 7A:
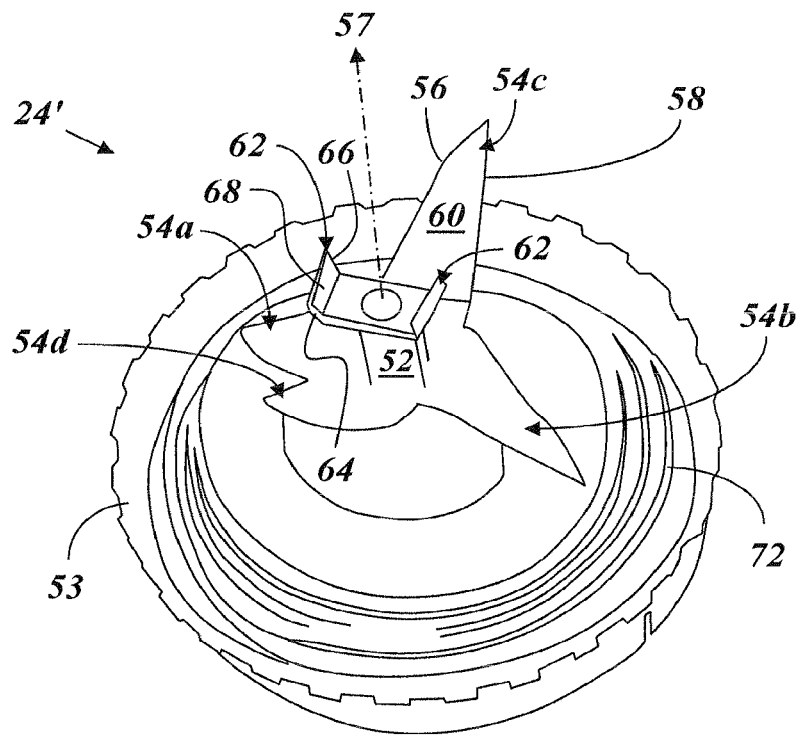
FIGS. 7A and 7B are perspective views of a hub supporting a rotatable blade assembly according to an example embodiment of the present invention.
Figure 7B:
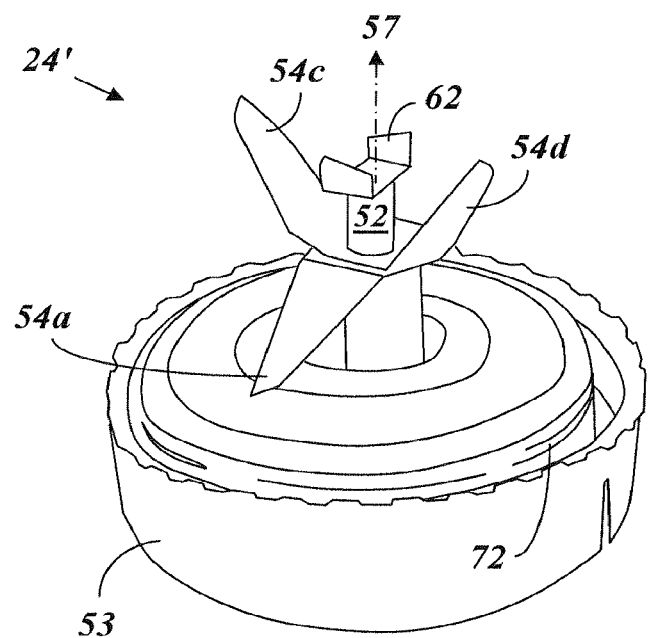

FIGS. 7A and 7B depict perspective views of a hub 52 supporting a rotatable blade assembly 24' in accordance with a further illustrative embodiment of the present invention. In the example embodiment of FIGS. 7A and 7B, the hub 52 is a generally cylindrical axle. However, the hub 52 alternatively may be implemented using any other suitable shape and/or structure (e.g., conical, etc.). The hub 52 has a central axis 57 about which the rotatable blade assembly 24' is adapted to rotate.

The hub 52 extends upward from a foundation 53 adapted to couple with the container 12 at the bottom section 14, e.g., by screwing onto the bottom section 14. Specifically, the foundation 53 may include interior threads 72 enabling the foundation 53 to be screwed onto the bottom section 14 of the container 12.

Furthermore, the foundation 53 may include a gasket (not shown) adjacent the interior threads 72 to ensure that a substantially complete seal is formed when the foundation 53 is coupled to the container 12.

The rotatable blade assembly 24' generally includes a plurality of cutting blades 54a-d extending radially outward from the hub 52. Each of the cutting blades 54a-d has a sharp cutting edge 56, a blunt spine edge 58, and a cutting blade face 60 therebetween. In general, two or more of the cutting blades 54a-d may be included in pairs. Furthermore, one or more of the cutting blades 54a-d generally can extend both radially outward from the hub 52 and longitudinally upward or longitudinally downward along the hub 52. For example, in accordance with the embodiment of FIGS. 7A and 7B, the cutting blades 54a-d can include a first pair of opposing cutting blades 54a, 54b extending radially outward from the hub 52 and longitudinally downward along the hub 52, as well as a second pair of opposing cutting blades 54c, 54d extending radially outward from the hub 52 and longitudinally upward along the hub 52. The first pair of opposing cutting blades 54a, 54b are "opposing" in that they are disposed around the hub 52 separated by an angular displacement of about 180 degrees. The second pair of opposing cutting blades 54c, 54d likewise are "opposing" in that they are disposed around the hub 52 separated by an angular displacement of about 180 degrees. As depicted in FIGS. 7A and 7B, the first pair of opposing cutting blades 54a, 54b and the second pairs of opposing cutting blades 54c, 54d are disposed around the hub 52 separated from each other by an angular displacement of about 90 degrees.

Although four cutting blades 54a-d are depicted in the example embodiment of FIGS. 7A and 7B, it should be appreciated that any other number of cutting blades 54a-d (e.g., one, two, three, five, six, etc.) alternatively can be included in the rotatable blade assembly 24'. Furthermore, although the cutting blades 54a-d are generally separated by about 90 degree increments in the example embodiment of FIGS. 7A and 7B, it should be appreciated that the cutting blades 54a-d alternatively can be separated by any other suitable amount(s), which may be a uniform or variable amount among the plurality of cutting blades 54a-d.

In addition to the cutting blades 54a-d, the rotatable blade assembly 24' can include at least one crushing blade 62 extending longitudinally outwardly from the hub 52 (e.g., vertically upward, as oriented in FIGS. 7A and 7B). Each crushing blade 62 has a first edge 64, a second edge 66, and a crushing blade face 68 therebetween. In the example embodiment of FIGS. 7A and 7B, two crushing blades 62 are disposed around the hub 52 separated by an angular displacement of about 90 degrees. The two crushing blades 62 are substantially parallel to each other, as depicted. The crushing blade face 68 of each crushing blade 62 can be substantially flat and can be oriented to be substantially perpendicular to a tangent line drawn from the central axis 57 to the point halfway between the first and second edges 64, 66, as depicted in FIGS. 7A and 7B. Each of the crushing blades 62 can have a top edge that is sloped (e.g., by 45 degrees, or any other amount) relative to a plane containing a direction of rotation of the rotatable blade assembly 24'. It should be noted that the first edge 64 and second edge 66 represent smaller dimensions of the blade, while the crushing blade face 68 is a relatively substantially greater dimension, as would be interpreted in accordance with the customary labels for these parts of a knife blade or similar structure.

The hub 52 can be adapted to rotate a first direction (e.g., clockwise) as well as a second direction opposite the first direction (e.g., counterclockwise). For purposes of illustration and clarity of the present description, in various examples provided herein the first direction is referred to as being clockwise and the second direction is referred to as being counterclockwise. However, it should be appreciated that the first direction alternatively can be counterclockwise and the second direction alternatively can be clockwise.

In accordance with the example embodiment of FIGS. 7A and 7B, the cutting blades 54 are all oriented in such a way that when the hub 52 rotates in the first directions (e.g., clockwise), the sharp cutting edge 56 of each cutting blade 54 is a leading surface and the blunt spine edge 58 of each cutting blade 54 is a trailing surface. Further due to this illustrative orientation of the cutting blades 54, when the hub 52 rotates in the second direction (e.g., counterclockwise), the blunt spine edge 58 of each cutting blade 54 is a leading surface and the sharp cutting edge 56 of each cutting blade 54 is a trailing surface. A "leading surface," as used herein, generally refers to a surface of an object that is first to be impacted (e.g., by food products contained in the work chamber 20) during rotation of the object in a manner tending to crush the food product. Furthermore, a "trailing surface" generally refers a surface opposite or following the leading surface as it moves. Furthermore, a "surface" can be either a narrow edge, or can be a wider face, of the blade structure.

Figure 8:
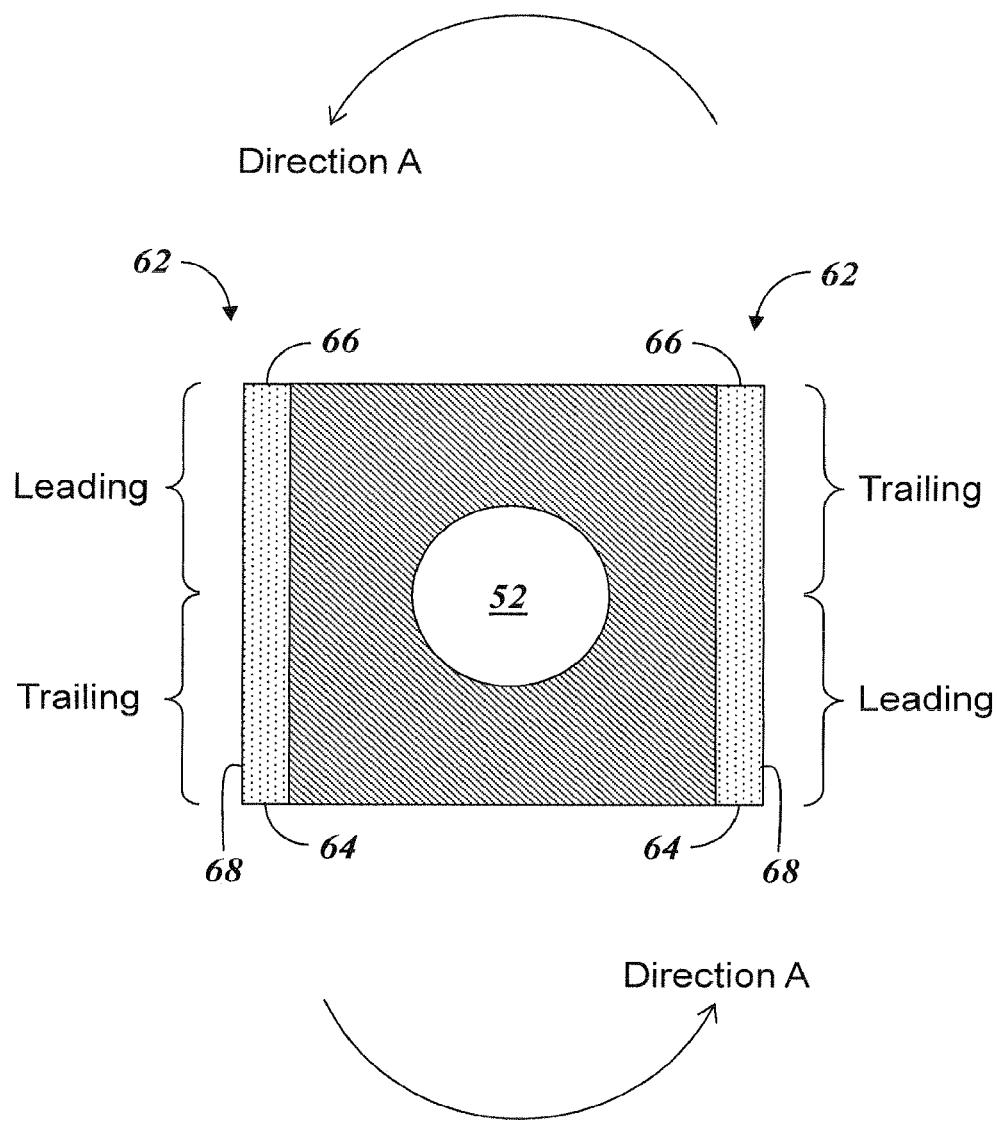
FIG. 8 is a top view of the hub supporting the rotatable blade assembly of FIGS. 7A and 7B, according to aspects of the present invention.

Each crushing blade 62 can be oriented in such a way that its crushing blade face 68 is a leading surface when the hub 52 rotates in the first direction (e.g., clockwise) and a trailing surface when the hub 52 rotates in the second of the two opposite directions (e.g., counterclockwise). For example, FIG. 8 depicts a top view of the crushing blades 62. As shown, when the hub 52 rotates in "direction A" (e.g., counterclockwise), the rearward portion of the crushing blade 62 (e.g., relative to the direction of motion) is a leading surface which impacts and makes direct contact with the food products a manner enabling the food products to be crushed. The frontward portion of the crushing blades 62 (e.g., relative to the direction of motion), which is opposite and follows behind the rearward portion, is a trailing surface.

Since the crushing blades 62 extend longitudinally outwardly from the hub 52 (that is, longitudinal being a direction generally parallel to the central axis 57 about which the hub 52 rotates), food products contacting the crushing blades 62 during rotation of the hub 52 will be struck by the rearward half (relative to the direction of rotation) of the crushing blades 62, e.g., the leading surface as depicted in FIG. 8. Specifically, given the angle at which the rearward half of the crushing blades 62 will impact the food products, the food products will experience a blunt force exerted by the, e.g., substantially flat crushing blade face 68 which will tend to break up (e.g., crush) the impacted food products.

Figure 9:
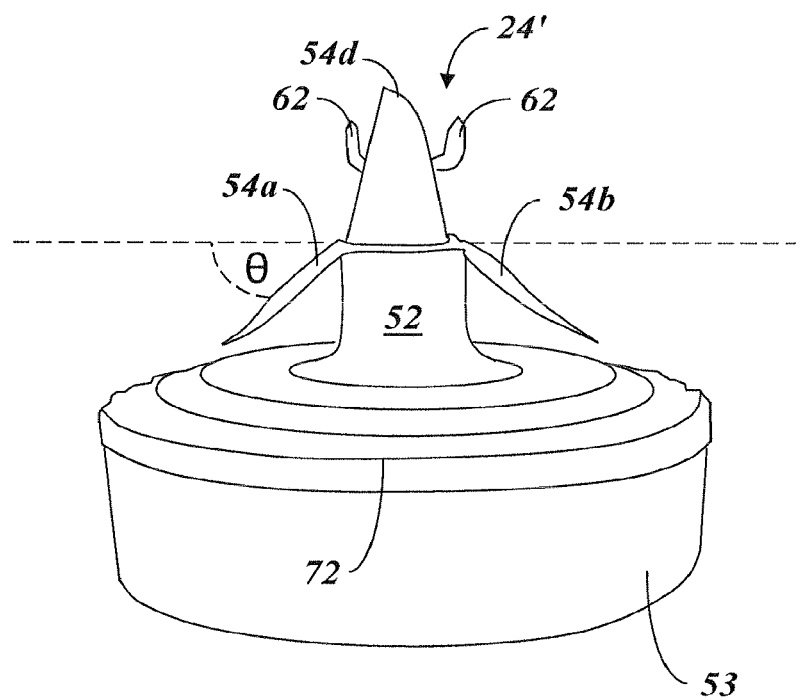
FIG. 9 is a first side view of the hub supporting the rotatable blade assembly of FIGS. 7A and 7B, according to an example embodiment of the present invention.
Figure 10:
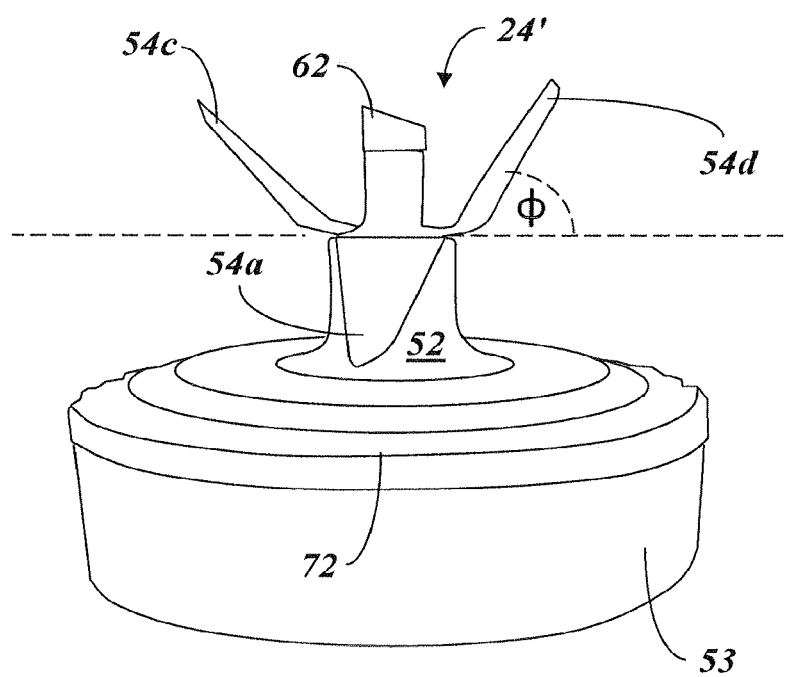
FIG. 10 is a second side view of the hub supporting the rotatable blade assembly of FIGS. 7A and 7B, according to aspects of the present invention.

Reference is now made to FIGS. 9 and 10, which depict side views of the rotatable blade assembly 24' of the example embodiment of FIGS. 7A, 7B and 8. In general, one, some, or all of the cutting blades 54a-54d can each optionally have some curvature in the respective cutting blade face 60 (e.g., may curve longitudinally downward or upward). The curvature can be useful, for example, in generating a sphere-like mixing effect. For example, the cutting blade 54a can have a first radius of curvature and the opposing cutting blade 54b has a second radius of curvature; and the second radius of curvature of the opposing cutting blade 54b can be smaller than, greater than, or equal to the first radius of curvature. Furthermore, the cutting blade 54c can have a third radius of curvature and the opposing cutting blade 54d can have a fourth radius of curvature; and the fourth radius of curvature may be greater than, less than, or equal to the third radius of curvature.

As described previously herein, as each of the cutting blades 54a-d can extend both radially outward from the hub 52 and longitudinally upward or longitudinally downward along the hub 52, each of the cutting blades 54a-d can be disposed at an angle relative to a plane containing the direction of rotation of the hub 52 (e.g., relative to the horizontal, as oriented in FIGS. 9 and 10). For example, in accordance with the example embodiment of FIGS. 9 and 10, the cutting blades 54a, 54b can be disposed at an angle .theta. away from a plane containing (a) a direction of rotation of the hub 52, (b) the point of connection between the hub 52 and the cutting blade 54a, and (c) the point of connection between the hub 52 and the cutting blade 54b. The angle .theta. thus indicates the slope in the cutting blades 54a, 54b and generally can be about 45 degrees, or any other suitable angle (e.g., greater or less than 45 degrees). Furthermore, the cutting blades 54a, 54b need not be sloped at the same angle .theta. as each other. Similarly, the cutting blades 54c, 54d can be disposed at an angle .phi. away from a plane containing (a) a direction of rotation of the hub 52, (b) the point of connection between the hub 52 and the cutting blade 52c, and (c) the point of connection between the hub 52 and the cutting blade 52d. The angle .phi. thus indicates the slope in the cutting blades 54c, 54d relative to the plane containing a direction of rotation of the hub 52. The angle .phi. generally can be about 45 degrees, or any other suitable angle (e.g., greater or less than 45 degrees). Furthermore, the cutting blades 54c, 54d need not be sloped at the same angle .phi. as each other.

Figure 11:
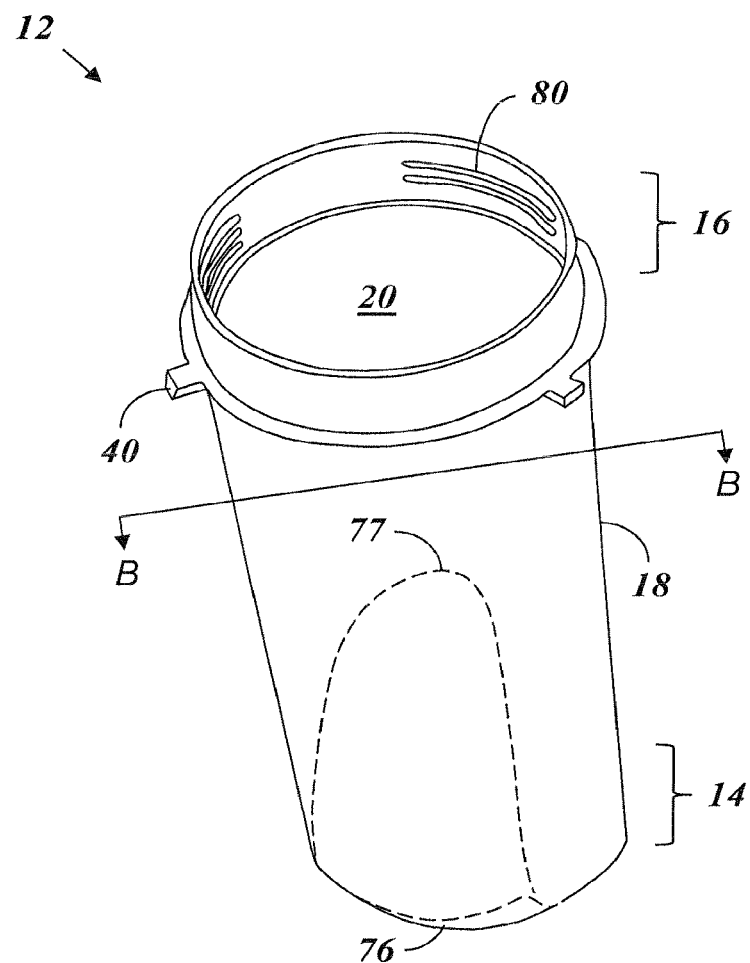
FIG. 11 is a perspective view of a container adapted for use with the rotatable blade assembly of FIGS. 7A through 10.
Figure 12:
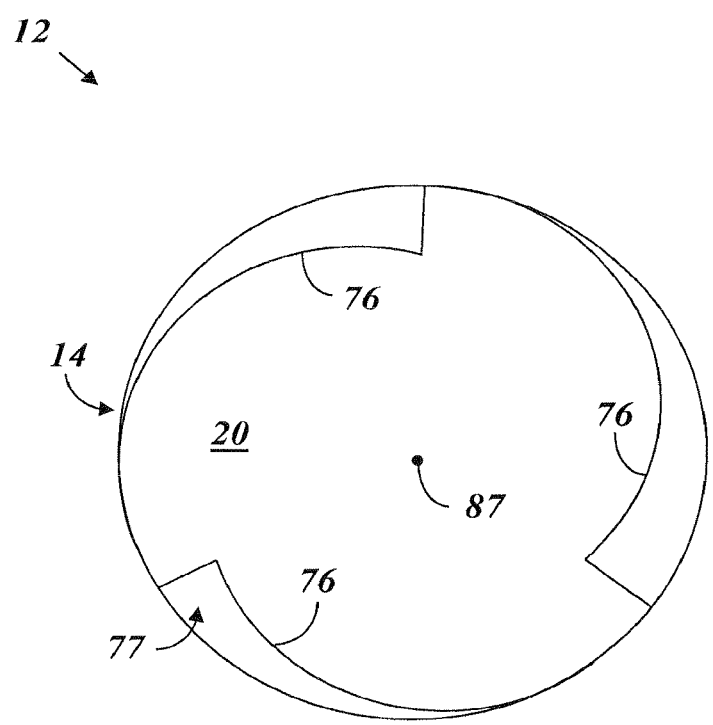
FIG. 12 is a view of the container of FIG. 11 looking down along from B-B, according to aspects of the present invention.

FIG. 11 depicts an example embodiment of the container 12 adapted for use with the rotatable blade assembly 24' of FIGS. 7A, 7B and 8. FIG. 12 further depicts a view of the container 12 of FIG. 11 looking down on the bottom section 14 from line B-B in FIG. 11. As shown in FIG. 11, the container 12 can include interior threads 80 formed in the top section 16, for enabling the container 12 to couple with the lid 32. Additionally or alternatively, the container 12 can include interior threads (not shown) formed in the bottom section 14 of the container, for enabling the container 12 to couple with the foundation 53 by mating with the interior threads 72 of the foundation 53. Although the interior threads 80 are shown, it should be appreciated that exterior threads, or any other suitable coupling mechanism, alternatively or additionally may be included to enable coupling between the container 12 and the foundation 53.

As depicted in FIGS. 11 and 12, the container 12 optionally may include a plurality of ledge surface features 76 adapted to facilitate the processing of food products. The plurality of ledge surface features 76 may extend from an interior face of the bottom section 14 inward toward a center of the bottom section 14. The ledge surface features 76 can be sized, dimensioned, and oriented, in such a way as to hinder vortex formation by food contents within the work chamber 20 during a blending operation. For example, each of the plurality of ledge surface features 76 can include a surface that curves inward and which has a decreasing radius of curvature as measured from a center point 87 of the bottom section 14. Each of the plurality of ledge surface features 76 additionally can terminate in an abrupt ledge 77, at which point the surface extends from an interior face of the bottom section 14 radially inward toward the center 87 of the bottom section 14, e.g., to form a corner jutting into the work chamber 20.

Beneficially, disrupting a vortex in this way can help improve processing the food products by allowing the food products to be more thoroughly mixed. As would be appreciated by one of skill in the art, the presence of a vortex in the work chamber 20 can decrease the thoroughness with which food products are mixed and exposed to the rotatable blade assembly 24. Stated differently, vortexes increase the likelihood of at least some food products bypassing the food processing functions of the blender system 10, e.g., by becoming lodged away or stuck near the outer perimeter of the vortex away from the rotatable blade assembly 24. Furthermore, the interior of the container 12 may include a plurality of ribs (not shown) adapted to facilitate the processing of food products in the work chamber 20 similarly by disrupting the formation or the presence of vortexes within the work chamber during operation of the rotatable blade assembly 24.

In addition to coupling with the container 12, the foundation 53 further can be adapted to couple with the base 30, as will now be described. The underside of the foundation 53 generally may be sized and shaped to fit securely within the volume of space defined by the cylindrical wall 55 of the base 30. Furthermore, the foundation 53 additionally may include a gear unit adapted to drive rotation of the rotatable blade assembly 24'. For example, the gear unit can be coupled to the rotatable blade assembly 24' by one or more interior axles, rods, etc. The gear unit further can be adapted to mechanically couple with the gear unit 51 of the base 30, e.g., and can engage with the gear unit 51 of the base 30 once the bottom section 14 of the container 12 with the foundation 53 included therein is placed onto the base 30. Accordingly, rotation of the gear unit 51 of the base 30 can cause the gear unit of the foundation 53 to rotate, thereby causing the rotatable blade assembly 24' to rotate.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

The invention claimed is:

1. A blender system, comprising:
a container, comprising:
  a bottom section;
  one or more container walls extending upward from the bottom section and defining an interior volume of space forming a work chamber for processing one or more food products, the one or more walls terminating at a top section opposite the bottom section and having an opening providing access to the work chamber;
  a rotatable blade assembly disposed in the work chamber and operable for processing food contained within the work chamber through rotational action;
  a keeper disposed in the top section; and
  a slidable actuator shaft extending between the bottom section and the top section configured to slide between a first position and a second position;
a lid sized and dimensioned to cover the opening in the top section when positioned on top of the container, the lid comprising: a hinged actuator lever with at least one locking tab sized, dimensioned, and oriented to engage with the keeper to mechanically lock the lid to the container when pivoted from a first position to a second position;
a detent disposed in the hinged actuator lever and sized, dimensioned, and oriented to intersect with the slidable actuator shaft of the container when the lid is positioned on top of the container and the hinged actuator lever is pivoted to the second position; and
a motorized unit disposed in a base configured to receive and couple with the container in such a way as to mechanically couple the motorized unit with the blade assembly to supply rotational energy thereto, the motorized unit activated by a mechanical switch;
wherein when the detent of the lid intersects with the slidable actuator shaft of the container, the slidable actuator shaft slides from the first position to the second position in such a way as to mechanically intersect with and move the mechanical switch from an off position to an on position, thereby activating the motorized unit and causing the blade assembly to rotate.

2. The blender system of claim 1, wherein the slidable actuator shaft has a spring force applied thereto pushing the slidable actuator shaft toward the first position.

3. The blender system of claim 2, wherein a force applied by the detent against the slidable actuator shaft is sufficient in quantity so as to overcome the spring force and cause the slidable actuator shaft to move from the first position toward the second position.

4. The blender system of claim 2, further wherein when the hinged actuator lever is pivoted away from the second position toward the first position, the detent no longer intersects with the slidable actuator shaft and the spring force is sufficient in quantity to return the slidable actuator shaft to the first position.

* * * * *